United States Patent [19]

Overlach et al.

[11] Patent Number: 5,095,634
[45] Date of Patent: Mar. 17, 1992

[54] INSTRUMENT FOR SIMULTANEOUSLY MEASURING A SUCCESSION OF CYLINDER BORES

[75] Inventors: Knud Overlach, Ettlingen; Manfred Wamser, Karlsruhe, both of Fed. Rep. of Germany

[73] Assignee: Pietzsch Automatisierungstechnik GmbH, Ettlingen, Fed. Rep. of Germany

[21] Appl. No.: 548,926

[22] PCT Filed: Dec. 7, 1989

[86] PCT No.: PCT/DE89/00759
§ 371 Date: Jul. 25, 1990
§ 102(e) Date: Jul. 25, 1990

[87] PCT Pub. No.: WO90/06487
PCT Pub. Date: Jun. 14, 1990

[30] Foreign Application Priority Data

Dec. 9, 1988 [DE] Fed. Rep. of Germany ....... 3841439

[51] Int. Cl.$^5$ ............................ G01B 7/12; G01B 7/31; G01B 5/12
[52] U.S. Cl. ........................................ 33/548; 33/543; 33/544.5; 33/600
[58] Field of Search ............... 33/548, 542, 543, 544.5, 33/549–553, 521, 546, 557, 560, 600, 601, 605, 712, 832, 833, 836, 520

[56] References Cited

U.S. PATENT DOCUMENTS

| | | | |
|---|---|---|---|
| 3,889,380 | 6/1975 | Albertazzi | 33/548 |
| 4,006,529 | 2/1977 | Herman | 33/548 |
| 4,338,726 | 7/1982 | Swailes | 33/542 |
| 4,412,385 | 11/1983 | Selleri | 33/520 |
| 4,916,824 | 4/1990 | Shimazutsu et al. | 33/551 |
| 4,986,004 | 1/1991 | Hartmann et al. | 33/552 |

FOREIGN PATENT DOCUMENTS

| | | | |
|---|---|---|---|
| 225829 | 10/1959 | Australia | 33/557 |
| 1426466 | 12/1965 | France | 33/548 |

Primary Examiner—William A. Cuchlinski, Jr.
Assistant Examiner—C. W. Fulton
Attorney, Agent, or Firm—Max Fogiel

[57] ABSTRACT

A probe is an elongated tube with sensors positioned to match the cylinder bores with respect to number and distance apart and having radially projecting contact pins. When employed as intended, the probe rotates and slides back and forth in stationary bearings that are in turn accommodated in uprights in a stand. The probe extends through the bores of the work, which is precisely positioned between the uprights by the same bearings. A drive unit with a driveshaft in alignment with the probe and with motors that operate in conjunction with the latter to generate a translation and a rotation respectively is also mounted stationary in the stand independent of the aforesaid bearings. One end of the probe is coupled to the driveshaft such that it can neither rotate on nor slide axially along it by a universal joint that compensates within limits for angular error and radial shaft displacement.

9 Claims, 2 Drawing Sheets

INSTRUMENT FOR SIMULTANEOUSLY MEASURING A SUCCESSION OF CYLINDER BORES

BACKGROUND OF THE INVENTION

The invention concerns an instrument for simultaneously measuring a succession of cylinder bores, especially the bores in the bearing lanes of motor blocks, cylinder heads, and similar structures, with respect to shape and alignment.

An instrument of this type and for this purpose is known from the sales literature PAT MULTI-INCOMETER. The instrument is a mobile piece of equipment used to measure a succession of bores like the bores in a crankshaft bearing lane for roundness, geometrical defects, and alignment. It has a probe that operates in conjunction with two motors and a drive mechanism, generating a rotary motion and an axial motion, that is provided with heads associated with the bores in the work that are to be measured with respect to number and position, and that extends when employed as intended through the bores. The probe rotates and slides back and forth in bearings at each end. The bearings can be secured to the particular face of the work by a universal suspension, allowing angular error in the faces of the work to be compensated for within design-dictated limits. The drive unit that the end of the probe extends through is flanged to one of these bearings.

The known instrument has been proven outstanding for measuring bearing lanes that have large-measure bores and/or are not too long. For very long bore lanes and/or small-diameter bores on the other hand there is an unacceptable risk of contaminated results because the drive unit flanged like a projecting collar onto one of the probe's bearings exerts bending moments on the probe that can distort it in ways difficult to correct for.

SUMMARY OF THE INVENTION

The object of the present invention is accordingly to so improve an instrument of the aforesaid type and for the aforesaid purpose that any incorrect results deriving from flections in the probe will at least be extensively reduced and that even very long bore lanes and/or bores with short diameters can be precisely measured.

This object is attained in accordance with the invention in an instrument for simultaneously measuring a succession of bores with respect to shape and alignment in that a probe is an elongated tube with sensors positioned to match the cylinder bores with respect to number and distance apart and having radially projecting contact pins, in that, when employed as intended, the probe rotates and slides back and forth in stationary bearings that are in turn accommodated in uprights in a stand and extends the bores in the work, which is precisely positioned between the uprights by the same bearings, in that a drive unit with a driveshaft in alignment with the probe and with motors that operate in conjunction with the latter to generate a translation and a rotation respectively is also mounted stationary in the stand independent of the aforesaid bearings, and in that one end of the probe is coupled to the driveshaft such that it can neither rotate on nor slide axially along it by a universal joint that compensates within limits for angular error and radial shaft displacement.

Considering the operational relationship between the probe and the drive unit's driveshaft by way of a universal joint that compensates within design-dictated limits for angular error and radial shaft displacement between the driveshaft and the probe, the instrument in accordance with the invention incorporates a drive mechanism that is practically free of transverse forces for a probe that is also mounted completely independent of the drive unit.

To promote the desired adaptability of the instrument to various conditions the universal joint is rigidly secured to the takeoff end of the driveshaft in the drive unit and the probe is coupled to the universal joint in such a way that it cannot rotate on or slide along it but can be released from it, by a clutch. The clutch can be a compression clutch with a slotted compression ring that has a cylindrical accommodation for one of the probe's insertion pins and that can be radially tensioned by a screw.

In spite of the practical absence of transverse forces on its drive mechanism, the probe can still bend under its own weight when it is very long or when it is designed for measuring cylinder bores with short diameter. This problem is addressed in one advanced embodiment of the invention in that an adapter that projects out of the end of the probe remote from the drive unit and has a prescribed and variable counterweight can be fastened to that end such that it can neither rotate on nor slide along it in order to apply a bending moment to the probe that will compensate for any flections due to the probes own weight.

The bearings at each end of the probe in another advanced version of the invention can be removed from their associated uprights in the stand and replaced. It is in this case practical for each bearing in the probe to be associated with a supporting disk that is in turn accommodated in a high-precision bore that extends all the way through its upright in the stand and that it can be removed from and replaced in. Replacement is accordingly simplified to replacing the disks that the bearings are associated with.

The bearings at each end of the probe can be friction bearings that are not as wide as their diameter and that have bores that expand toward the faces of the bearings. They can alternatively be self-aligning bearings.

Given that the instrument in accordance with the invention is intended for measuring short-diameter cylinder bores, it is of advantage for the sensors to be integrated into the probe, with only the points of the contact pins extending radially beyond its surface.

BRIEF DESCRIPTION OF THE DRAWINGS

One embodiment of the instrument in accordance with the invention will now be described with reference to the schematic drawings, wherein.

DESCRIPTION OF THE PREFERRED EMBODIMENTS

Figure 1:
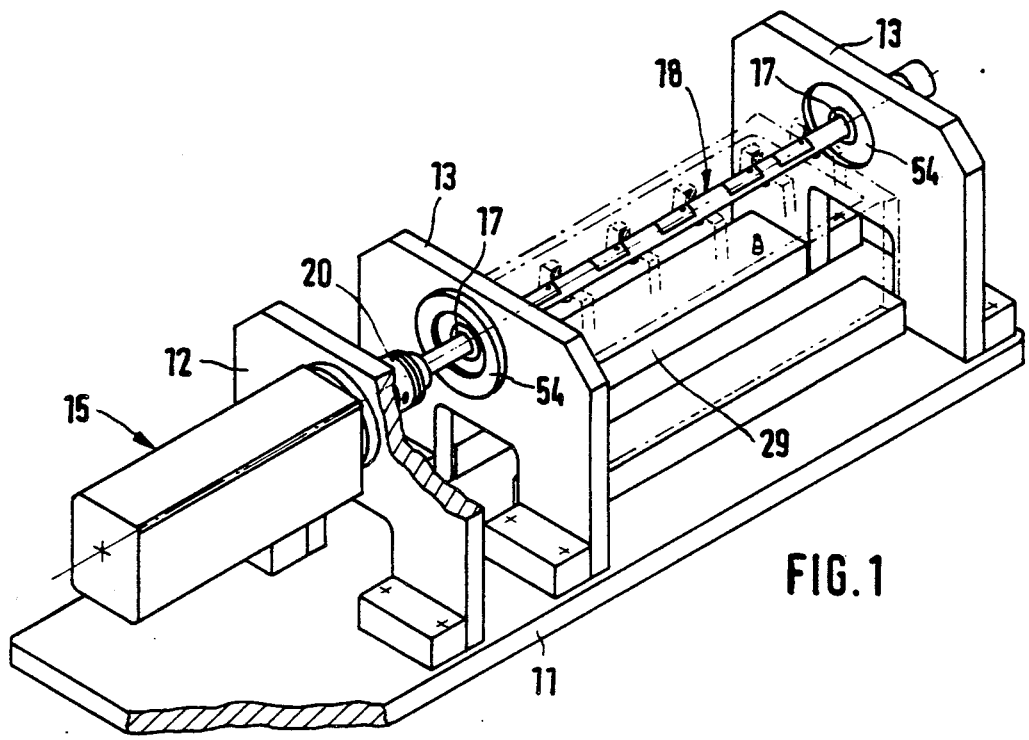
FIG. 1 is an overall perspective view of an instrument for measuring the bearing bores in a bearing lane in the cylinder head, schematically represented by the dot-and-dash lines, of an internal-combustion engine.
Figure 2:
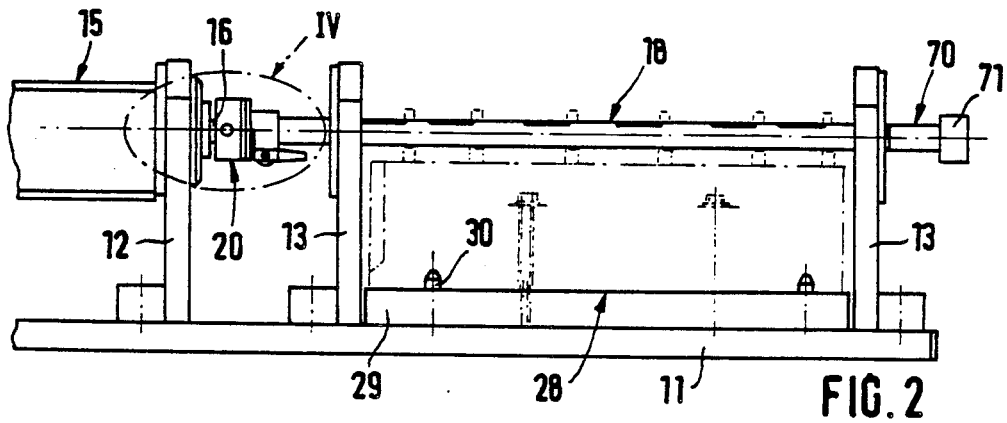
FIG. 2 is a front view of the instrument with the work also represented by dot-and-dash line.
Figure 3:
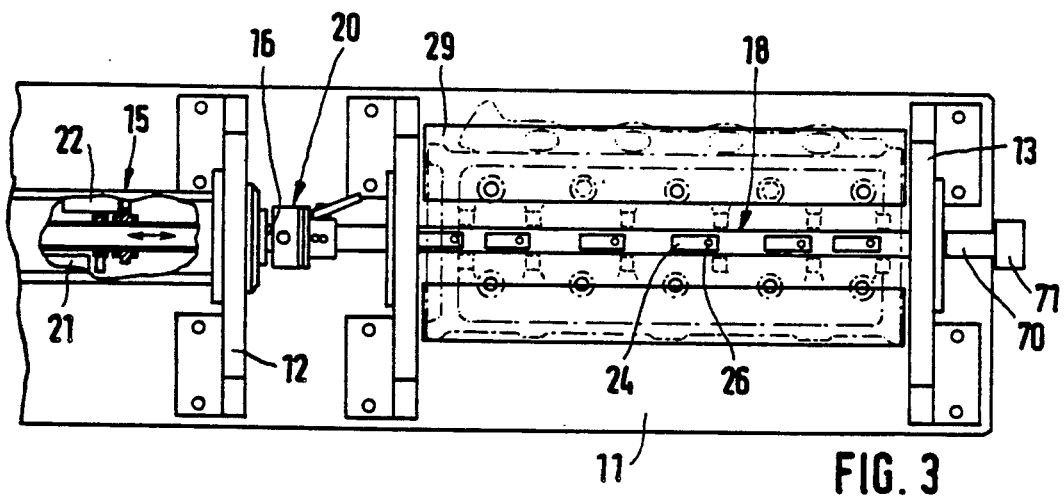
FIG. 3 is a top view of the instrument illustrated in FIG. 2.
Figure 4:
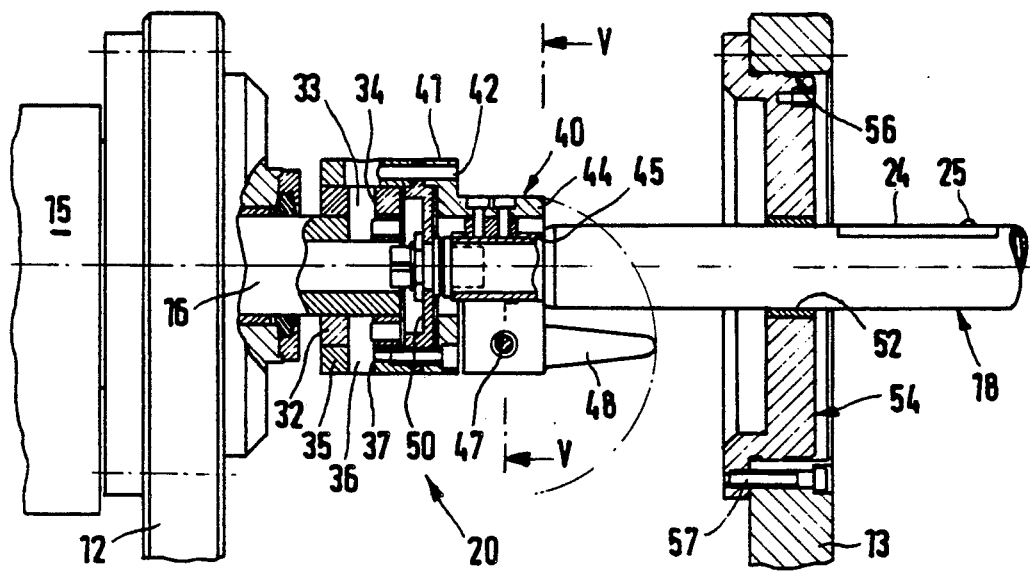
FIG. 4 is a detail of the area IV in FIG. 2 where the probe is rigidly secured to the driveshaft of a drive unit that is in turn securely flanged to an upright by a universal joint illustrated in section.
Figure 5:
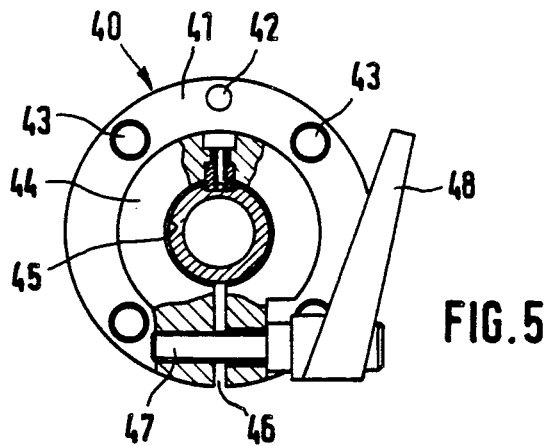
FIG. 5 is a section along the line V—V in FIG. 4 through the probe and through the vicinity of the clutch's slotted compression ring that can be radially tensioned with a screw to couple the probe to the driveshaft in the drive unit such that it can be uncoupled therefrom.

An instrument 10 illustrated in its entirety in FIGS. 1 through 3 comprises a stand consisting of a base plate 11 that accommodates three uprights 12 and 13. Flanged securely onto outer upright 12 is a drive unit 15 with a driveshaft 16 that extends through the uprights. A probe 18 is mounted in alignment with driveshaft 16 in bearings 17 in the two uprights 13 such that it can rotate and slide back and forth. Probe 18 is coupled to the driveshaft such that it cannot rotate on or slide along it but can be released from it by a universal joint 20.

The driveshaft 16 in drive unit 15 can rotate and move back and forth axially and operates in conjunction with two motors 21 and 22, which generate a rotation and a translation respectively. The probe 18 that is securely coupled to and can be released from the driveshaft has sensors 24 positioned to match the cylinder bores with respect to number and distance apart. The sensors have contact pins 26 with points 25 that project radially beyond the surface of the probe.

When the instrument is employed as intended, work 28 is positioned precisely between uprights 13 with the bearings 17 that accommodate probe 18 in a known way in that index pins 30 on positioning blocks 29 engage indexing bores introduced into the work from one end of the upper mount. The particular work is a cylinder head with a succession of mutually separated bearing bores, through which the probe, equipped with sensors 24 equal in number and distribution extends.

Universal joint 20, which ensures transmission free of transverse forces of the motion of the driveshaft 16 in drive unit 15 to probe 18, is mounted on the takeoff end of the driveshaft that extends through the outer upright 12 in the stand that the drive unit is rigidly flanged to. Universal joint 20 comprises an inner ring 32 that is loosely mounted on the takeoff end of the driveshaft by radial entraining pins 33. The entraining pins engage radial bores in the driveshaft and are secured by worm screws screwed into threaded bores that extend in from the face.

The sections of entraining pins 33 that extend beyond the driveshaft engage radial bores in inner ring 32 that are provided with bearing bushings 34. The inner ring of the universal joint can accordingly, since it is loosely mounted on the driveshaft, execute limited radial motions in relation to the driveshaft. Inner ring 32 is also loosely surrounded by an outer ring 35, and the two rings are fastened together such that they cannot rotate or slide in relation to each other by entraining pins 36 that are rotated 90° in relation to the aforesaid entraining pins 33. Entraining pins 36 are securely accommodated in radial bores in inner ring 32 and further secured by worm screws screwed into threaded bores in the face. The radial bores in outer ring 35 are also equipped with bearing bushings 37. The entraining pins and the bearing bores, lined with their bushings, in the inner and outer rings accordingly constitute friction bearings that allow, to the extent permitted by the play between driveshaft 16 and inner ring 32 on the one hand and between inner ring 32 and outer ring 35 on the other hand, radial motions and limited rotations o the part of the rings in relation to each other. The universal joint will accordingly not only compensate for angular error but will also accommodate radial shaft displacement.

A probe 18 can be coupled to the driveshaft 16 in drive unit 15 when desired by means of a clutch 40 with a sleeve 41 that is secured at the takeoff end to the outer ring 35 of universal joint 20 by a pin 42 accommodated in axial recesses and by screws 43 distributed over the circumference. A tensioning ring 44 extends from the clutch sleeve to the end facing away from universal joint 20. Tensioning ring 44 has a cylindrical accommodation 45 for the coupling pin of the particular probe 18 being coupled and a radial slot extending separated approximately 180° from the sleeve as well as in its vicinity and can be radially tensioned across the screw 47 extending to the slot by a tensioning lever 48. Between sleeve 41 and the outer ring 35 on universal joint 20 is an entraining disk 50 with an entrainer that positively engages a recess in the face of the pin on the particular probe being employed.

Figure 6:
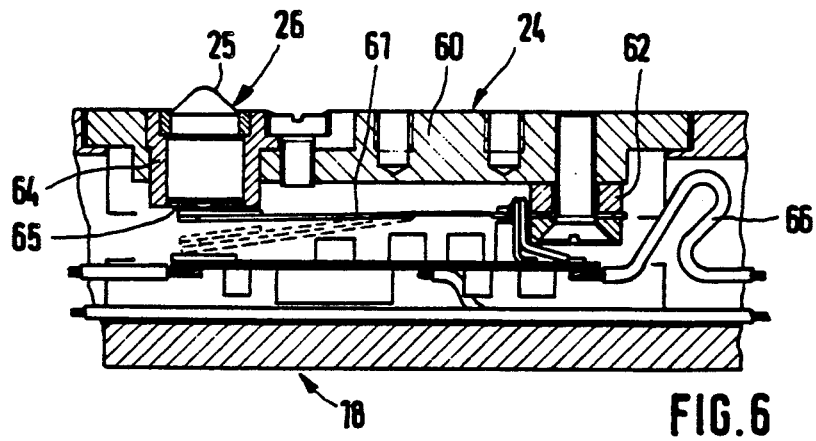
FIG. 6 is a magnified longitudinal section through the probe illustrating a sensor with a radially moving contact pin.

The bearings 17 at each end of probe 18 are friction bearings. Each comprises a bearing bowl 52 with a bore that tapers out to each end and a supporting disk 54 that securely accommodates the particular bowl. Tensioning rings 44 themselves are interchangeably accommodated in precision recesses 56 aligned with the axis of the driveshaft 16 in drive unit 15 in the uprights 13 in the stand that demarcate each side of a work holder and are secured by threaded connections 57 on each upright. The instrument can be easily refitted by replacing the probe along with the bearings at each end and the supporting disks that accommodate them. As previously mentioned herein, probe 18 is equipped with sensors 24 that match the cylinder bores being measured in number and distance apart. The sensors are completely integrated into the probe, with only the points 25 of the radially movable contact pins 26 projecting beyond its surface. FIG. 6 illustrates one of the sensors, all of which are identical in design. The sensor is an insert 60 that fits into a transverse recess in probe 18 and matches its outer surface. A leaf spring 61 provided with expansion strips is tensioned into one end of a threaded inner securing block 62 in insert 60. Contact pin 26 acts on the free end of the spring. The point 25 of the contact pin projects radially beyond the surface of the probe and moves back and forth in a positioning bushing 64 that is screwed into the insert. The section 65 of the contact pin that engages the free end of the spring is convex. The lines 66 illustrated in FIG. 6 extend through the tubular probe 18 and transmit signals in a known way in accordance with the particular deflection of the leaf spring 61 in each sensor, a procedure that will not be described in detail herein.

FIGS. 2 and 3 illustrate how an adapter 70 with a counterweight 71 is mounted on the end of probe 18 that faces away from drive unit 15. The purpose of the counterweight is to at least partly compensate for flections that occur in the probe between the bearings 17 at each end due to the probe's own weight by subjecting it to a prescribed bending moment.

The embodiment of the instrument in accordance with the invention described herein by way of example is employed to measure bearing bores for the camshaft bearings in the cylinder heads of internal-combustion engines. When the instrument is employed as intended, the work is accommodated on positioning blocks 29 between the uprights 13 that accommodate the bearings 17 at each end of the probe and positioned correctly by the index pins 30 that engage indexing bores in the work. Probe 18 will then extend through the axially separated bearing bores in the work. The contact pins 26 in sensors 24 will then be in the vicinity of the bores being measured. The bores are measured by sensing a series of adjacent inside circumferences. The probe is for this purpose rotated by a motor 21 in drive unit 15 and another motor 22, a stepper, in the drive unit advances it along the axis of the bore after each circumference has been sensed.

What is claimed is:

1. An instrument for simultaneously measuring a succession of cylinder bores with respect to shape and alignment, particularly bores in bearing lanes of motor blocks, cylinder heads, and similar structures of a workpiece, comprising: a probe with an elongated tube and sensors positioned to match the cylinder bores with respect to number and spacing and having radially projecting contact pins; stationary bearings held in uprights in a stand, said probe rotating and sliding back and forth in said stationary bearings and extending through bores in the workpiece, said workpiece being substantially precisely positioned between said uprights by said bearings; a drive unit with a drive shaft in alignment with said probe; motors in said drive unit and operating in conjunction with said probe to generate translational and rotational motion, said drive unit being mounted stationary in said stand independent of said bearings; a universal joint coupling one end of said probe to said drive shaft and preventing said probe from rotating on said shaft and sliding axially along said shaft, said universal joint compensating for angular error and radial shaft displacement within limits.

2. An instrument as defined in claim 1, wherein said universal joint is rigidly secured to a takeoff end of said driveshaft in said drive unit; and clutch means for releasing said probe from said universal joint, said probe being coupled to said universal joint so that said probe cannot rotate on said joint or slide along said joint but can be released therefrom by said clutch means.

3. An instrument as defined in claim 2, wherein said clutch means comprises a compression clutch with a slotted compression ring having a cylindrical accommodation for one of said contact pins of said probe; and screw means for radially tensioning said compression ring.

4. An instrument as defined in claim 10, including an adapted projecting out of an end of said probe remote from said drive unit and having a predetermined and variable counterweight, said adapted being fastened to said end of said probe so that said adapter can neither rotate on said probe nor slide along said probe to applying a bending moment to said probe for compensating against deflections due to own weight of said probe.

5. An instrument as defined in claim 1, wherein said bearings are located at each end of said probe and are removable from respective uprights and replaced in said stand.

6. An instrument as defined in claim 5, including a supporting disk associated with each bearing in said probe and located in a substantially high-precision bore extending entirely through its respective upright in said stand, said supporting disk being removable and replaceable.

7. An instrument as defined in claim 5, wherein said bearings are located at each end of said probe and are friction bearings, said bearings being less wide than their diameter and having bores expanding toward faces of said bearings.

8. An instrument as defined in claim 5, wherein said bearings comprise self-aligning bearings.

9. An instrument as defined in claim 1, wherein said sensors are integrated into said probe, said contact pins having points only extending radially beyond a surface of said probe.

* * * * *